United States Patent
Hus

(10) Patent No.: US 10,448,455 B2
(45) Date of Patent: Oct. 15, 2019

(54) RADIO COMMUNICATIONS GATEWAY AND RADIO COMMUNICATIONS TERMINAL

(75) Inventor: Olivier J-M. Hus, Redhill (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1621 days.

(21) Appl. No.: 11/576,751

(22) PCT Filed: Oct. 6, 2005

(86) PCT No.: PCT/IB2005/053288
§ 371 (c)(1),
(2), (4) Date: Apr. 5, 2007

(87) PCT Pub. No.: WO2006/038200
PCT Pub. Date: Apr. 13, 2006

(65) Prior Publication Data
US 2008/0031176 A1 Feb. 7, 2008

(30) Foreign Application Priority Data
Oct. 9, 2004 (GB) .................. 0422472.1

(51) Int. Cl.
*H04W 88/06* (2009.01)
*H04W 28/24* (2009.01)
(Continued)

(52) U.S. Cl.
CPC ............ *H04W 88/06* (2013.01); *H04W 28/24* (2013.01); *H04W 84/04* (2013.01); *H04W 84/18* (2013.01); *H04W 88/16* (2013.01); *H04W 92/02* (2013.01)

(58) Field of Classification Search
CPC ..... H04W 88/06; H04W 88/16; H04W 28/24; H04W 84/04; H04W 84/16; H04W 92/02
(Continued)

(56) References Cited

U.S. PATENT DOCUMENTS

| 5,487,180 A | 1/1996 | Ohtake |
| 7,016,673 B2 * | 3/2006 | Reddy et al. ............ 455/426.2 |

(Continued)

FOREIGN PATENT DOCUMENTS

| DE | 10244696 A1 | 4/2004 |
| EP | 1191750 A1 | 3/2002 |

(Continued)

OTHER PUBLICATIONS

R. Kapoor et al; "Link Layer Support", Conference on Computer Communications and Networks, ICCCN, 2003.
Bluetooth Specification, Version 1.1, Baseband Specification, 2001, XP002282703.

*Primary Examiner* — Steven S Kelley

(57) ABSTRACT

A mobile telephone 12 acts as a radio communications gateway between a 3G network 10 and a Bluetooth® network 11. A video conference call in the 3G network 10 is relayed over the Bluetooth® network 11 to and from a Bluetooth® enabled laptop Personal Computer (PC) 13, which therefore acts as a radio communications terminal. A Channel Quality Indicator (CQI) received by the mobile terminal 12 with the video conference content over the 3G network 10 is transmitted by the mobile telephone 12 to the laptop PC 13 over the Bluetooth® network 13 as a Pseudo-CQI (P-CQI). In this example, the P-CQI is sent in a FLOW control field of a header 40 of a Synchronous Connection Oriented (SCO) or extended SCO (eSCO) data packet of the Bluetooth® network 11. A video conference driver application running on the laptop PC 13 is then able to alter the video conference call properties according to the value of the P-CQI, thus responding to call quality conditions in the 3G network 10.

35 Claims, 3 Drawing Sheets

(51) Int. Cl.
*H04W 88/16* (2009.01)
*H04W 92/02* (2009.01)
*H04W 84/04* (2009.01)
*H04W 84/18* (2009.01)

(58) Field of Classification Search
USPC .......................................................... 370/312
See application file for complete search history.

(56) References Cited

U.S. PATENT DOCUMENTS

| | | | |
|---|---|---|---|
| 7,079,856 B2 * | 7/2006 | Khan | 455/517 |
| 7,352,709 B2 * | 4/2008 | Wakabayashi | 370/278 |
| 7,383,048 B2 * | 6/2008 | Jouppi et al. | 455/452.2 |
| 7,392,322 B2 * | 6/2008 | Ido et al. | 709/233 |
| 2003/0012207 A1 | 1/2003 | Klaghofer et al. | |
| 2003/0161285 A1 | 8/2003 | Tiedemann, Jr. et al. | |
| 2005/0220040 A1 * | 10/2005 | Petrovic et al. | 370/278 |
| 2006/0010204 A1 * | 1/2006 | Jalava et al. | 709/205 |
| 2006/0092869 A1 * | 5/2006 | Herrmann | 370/314 |
| 2006/0205443 A1 * | 9/2006 | Simoens | H04L 1/0003 455/574 |

FOREIGN PATENT DOCUMENTS

| | | |
|---|---|---|
| EP | 1341336 | 9/2003 |
| EP | 1353483 A2 | 10/2003 |
| JP | 2001145159 A | 5/2001 |
| JP | 2002199450 A | 7/2002 |

* cited by examiner

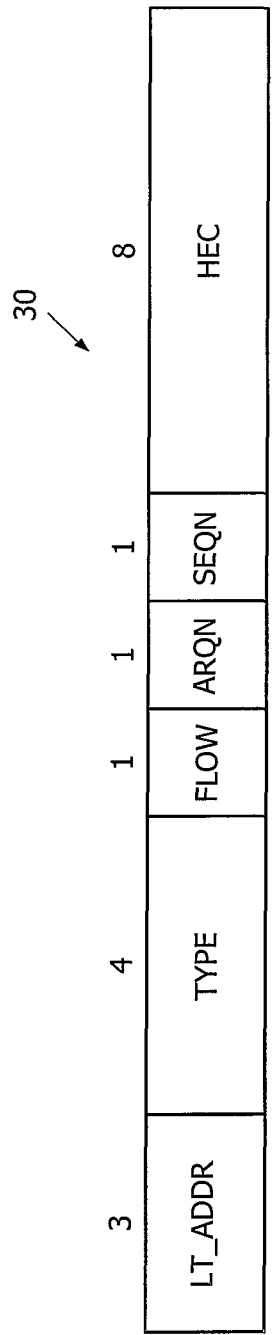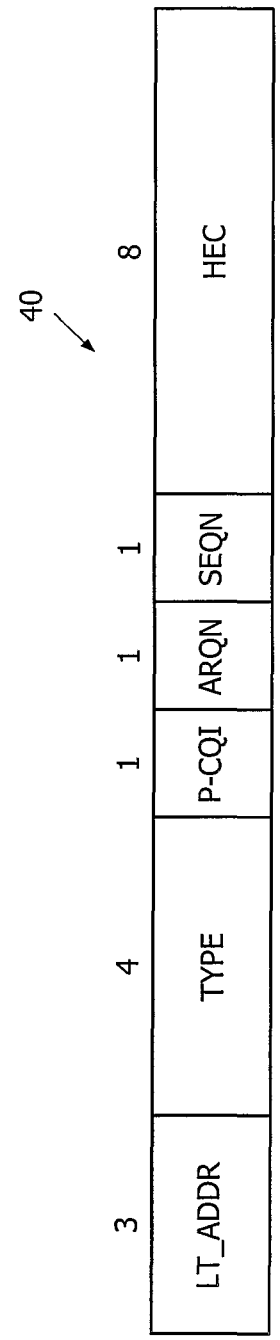
FIG. 3 (Prior Art)
FIG. 4

RADIO COMMUNICATIONS GATEWAY AND RADIO COMMUNICATIONS TERMINAL

This invention relates to a radio communications gateway and radio communications terminal, along with associated methods of operation. A particular, but not exclusive, application of the invention is a gateway between a mobile telecommunications network and a Bluetooth® network.

It is becoming increasingly common for radio communications to involve transmitting content, e.g. text messages, picture messages, web pages, audio data, audiovisual data, etc., across more than one radio communications network (e.g. a "source network" and a "peer network"). In other words, content is often now sent from one terminal to another terminal across two or more heterogeneous communications networks. This can occur, for example, when a Bluetooth® network is used to link peripheral devices to a mobile telephone. Whilst mobile telephones are usually intended to communicate primarily in a mobile telecommunications network, they can often relay the content of these communications to and from peripheral devices, e.g. a headset, camera/display combination, Personal Digital Assistant (PDA), laptop Personal Computer (PC), etc., using Bluetooth®. The mobile telephone therefore provides a gateway between the mobile telecommunications network and the Bluetooth® network.

Most radio telecommunications networks tend to have systems for managing signal quality. For example, in a Third Generation Wireless Format (3G) network signal quality is monitored by mobile telephones and by the network infrastructure (e.g. a base station) as they receive signals from one another over the network. The mobile telephones and network infrastructure add a Channel Quality Indicator (CQI) to signals that they transmit to one another over the network reflecting the monitored signal quality. They can then alter the way in which they transmit signals over the network depending on the CQI in the signals they receive. For example, the bandwidth allocated to a channel, the power at which signals are transmitted in a channel, the amount of Forward Error Correction (FEC) applied to a signal and such like can be varied to improve signal quality or cope with signal degradation. Similarly, in a Bluetooth® network, data packets received by Bluetooth® enabled devices are error checked and, if successful error checking falls below a threshold rate, a request can be transmitted for data packets to be retransmitted.

However, there are few useful mechanisms for passing signal quality information between networks. In particular, where signal quality degrades during communication in a source network, a peer network over which content is relayed to and from the source network can often have no knowledge of the signal quality degradation in the source network. This can cause a number of problems. For example, there may be a reduction in the number of data packets that are transferred from the source network to the peer network, as fewer packets can be successfully received over the source network. This means that fewer data packets need to be relayed over the peer network. The transmission capacity required in the peer network therefore falls, but as the peer network is unaware of the signal quality degradation in the source network, it may continue to allocate a fixed amount of transmission capacity to the relayed signal, with the result that overall transmission capacity in the peer network is wasted. Similarly, the peer network may continue to relay data packets to the source network at the fixed rate, but as signal quality has degraded in the source network, the source network may not be able to successfully transmit all the data packets over the source network at the rate they are received from the peer network. This might lead to a build up of unsent data packets at a network gateway between the networks causing memory overload or to data packets being randomly dropped from the signal sent over the source network to keep up with the rate that data packets are received from the peer network.

The present invention seeks to overcome these problems.

According to a first aspect of the present invention, there is provided radio communications gateway comprising:

a source receiver for receiving a source radio signal over a source communications network;

a peer transmitter for transmitting a peer radio signal over a peer communications network;

and an interface for passing content represented by the source radio signal from the source receiver to the peer transmitter for representation in the peer radio signal;

wherein the source radio signal includes a source quality of service indicator specifying quality of service in the source communications network and the peer transmitter transmits a representation of the indicator in the peer radio signal.

Also, according to a second aspect of the present invention, there is provided a method of operating a radio communications gateway, the gateway having a source receiver for receiving a source radio signal over a source communications network and a peer transmitter for transmitting a peer radio signal over a peer communications network, the method comprising:

passing content represented by the source radio signal from the source receiver to the peer transmitter for representation in the peer radio signal, wherein the source radio signal includes a source quality of service indicator specifying quality of service in the source communications network and the method includes the peer transmitter transmitting a representation of the indicator in the peer radio signal.

So, information about signal quality in the source network is transmitted over the peer network. The peer network can use this information to adapt to degradation in signal quality in source network and prevent communication problems in the peer network and/or the source network. In particular, other communications devices operating in the peer network, e.g. a terminal that receives the peer radio signal, can adapt to degradation in signal quality in the source network.

The peer transmitter can transmit the representation of the source quality of service indicator in variety of ways. However, it is preferred that the peer transmitter transmits the representation of the source quality of service indicator with the content. In other words, the representation of the indicator and the content may be transmitted together. In particular, it is preferred that the representation of the indicator is transmitted with the content to which the indicator applied in the source network. One way of doing this is to transmit the representation of the indicator and the content together in a data packet. For example, the peer transmitter may transmit the representation of the source quality of service indicator in a header of the data packet.

The representation of the source quality of service indicator may take a variety of forms. In a straightforward example, the representation of the source quality of service indicator may be the same as the source quality of service indicator, although perhaps encoded and/or modulated in accordance with the peer radio signal rather than the source radio signal. However, it is preferred that the interface converts the source quality of service indicator into a representation of the indicator. In other words, it is preferred that the method includes converting the source quality of service indicator into a representation of the indicator. It is particularly preferred that the representation of the indicator is shorter than the indicator. This can allow the representation to take up less transmission space in the peer radio signal than the indicator does in the source radio signal. Indeed, in a particularly preferred embodiment, the representation of the source quality of service indicator is only a single bit.

The source and peer communications networks may be any radio communication networks for transmitting content. Typically, the peer network is a wireless Local Area Network (LAN), such as a Wi-Fi® or Bluetooth® network. Indeed, it is particularly preferred that the peer network uses the Bluetooth® radio communications standard. Typically, the source communications network is a mobile telecommunications network. In particular, it may be a Third Generation Wireless Format (3G) network. However, it should be understood that the terms "source network" and "peer network" are used only for convenience and are not limiting in any way. Indeed, the peer network may be a mobile telecommunications network, such as a 3G network, and the source network may be a wireless Local Area Network (LAN), such as a Wi-Fi® or Bluetooth® (network.

The content may be any data or information, such as text messages, web pages or audio data. However, it is particularly preferred that the content is audiovisual data. The transmission of audiovisual data is very sensitive to uncompensated signal quality degradation, as it usually requires a large amount of transmission capacity and, in the case of streamed audiovisual data, only small transmission delays can be tolerated. The invention therefore particularly benefits the transmission of audiovisual data. Indeed, it is particularly preferred that the content is a video conference, which is becoming an increasingly common application across 3G and Bluetooth® networks.

In many radio communications networks different types of content are sent using data packets of slightly different format. This can result in some fields of the data packets being unused when certain types of content are being sent. The applicants have recognised that it may therefore be convenient to transmit the representation of the source quality of service indicator in a field of data packet that is unused for the particular type of content being transmitted. This can avoid the data payload of the data packets being taken up by the representation. For example, it is known that a FLOW bit in the header of baseband data packets in Bluetooth® is only used in Asynchronous Connection-Less (ACL) signals and not in Synchronous Connection Oriented (SCO) and extended SCO (eSCO) signals. SCO and eSCO signals are used to transmit video conference content and, in this case, the FLOW bit may therefore be used to transmit the representation of the source quality of service indicator. More generally, the peer transmitter may therefore transmit the representation of the source quality of service indicator in a field of the peer radio signal commonly used for flow control in the peer communications network.

Whilst the invention might be used for one way communications, it is most likely to be used for two way communications. The radio communications gateway may therefore further comprise:

a peer receiver for receiving a return peer radio signal over the peer communications network;

and a source transmitter for transmitting a return source radio signal over the source communications network, wherein the interface passes content represented by the return peer radio signal from the peer receiver to the source transmitter for representation in the return source radio signal and the return peer radio signal includes a peer quality of service indicator specifying quality of service in the peer communications network.

Similarly, where the gateway has a peer receiver for receiving a return peer radio signal over the peer communications network and a source transmitter for transmitting a return source radio signal over the source communications network, the method may further comprise:

passing content represented by the return peer radio signal from the peer receiver to the source transmitter for representation in the return source radio signal, wherein the return peer radio signal includes a peer quality of service indicator specifying quality of service in the peer communications network.

This allows signal quality information concerning the peer radio network to be passed to the source radio network. The gateway can then use this information to adapt communication in the source network to degradation in signal quality of peer radio signal and prevent communication problems in the peer network and/or the source network.

It is preferred that the source transmitter transmits a representation of the peer quality of service indicator in the source radio signal. Information about signal quality in the peer network is therefore transmitted over the source network. Other communications devices operating in the source radio network, e.g. a terminal that receives the source radio signal, can then adapt to degradation in signal quality in the peer communications network.

The gateway and its operation have been discussed above. However, according to a third aspect of the present invention, there is provided a radio communications terminal comprising:

a receiver for receiving from a radio communications gateway a peer radio signal over a peer communications network, the peer radio signal representing content from a source radio signal sent over a source communications network to the radio communications gateway, wherein the source radio signal includes a source quality of service indicator specifying quality of service in the source communications network and the receiver receives a representation of the indicator from the radio communications gateway with the content in the peer radio signal.

Similarly, according to a fourth aspect of the present invention, there is provided a method of operating radio communications terminal, the method comprising:

receiving from a radio communications gateway a peer radio signal over a peer communications network, the peer radio signal representing content from a source radio signal sent over a source communications network to the radio communications gateway, wherein the source radio signal includes a source quality of service indicator specifying quality of service in the source communications network and the method includes receiving a representation of the indicator from the radio communications gateway with the content in the peer radio signal.

So, the radio communications terminal receives information about signal quality in the source radio network. It can use this information to adapt to degradation of signal quality in the source network and prevent communication problems in the peer network and/or the source network. Indeed, it is preferred that the radio communications terminal comprises a controller for adapting communications in the peer communications network based on the received representation of the source signal quality indicator. Similarly, it is preferred that the method comprises adapting communications in the peer communications network based on the received representation of the source signal quality indicator.

The way in which communications are adapted can depend on the way in which degradation in signal quality is conventionally dealt with in either or both the source network and the peer network. It can also depend on the type of content being transmitted and received. However, where the terminal has a protocol stack, it is particularly preferred that the receiver receives the source quality of service indicator at a first layer in the protocol stack and interprets the indicator at a second layer in the protocol stack, the second layer being higher than the first layer. This allows adaptation of communications to be carried out at or above the higher layer in the protocol stack. Indeed, it is particularly preferred the second layer is an application layer. The application, e.g. the application that is handling the content being transmitted and received, can therefore adapt the communications.

Again, whilst the invention might be used for one way communications, it is most likely to be used for two way communications. The radio communications terminal therefore preferably comprises a transmitter for transmitting a return peer radio signal to the radio communications gateway over the peer communications network, the return peer radio signal representing content to be sent over the source communications network by the radio communications gateway, wherein the return peer radio signal includes a peer quality of service indicator specifying quality of service in the peer communications network.

Similarly, the method preferably comprises transmitting a return peer radio signal to the radio communications gateway over the peer communications network, the return peer radio signal representing content to be sent over the source communications network by the radio communications gateway, wherein the return peer radio signal includes a peer quality of service indicator specifying quality of service in the peer communications network.

This allows the gateway to pass information about signal quality in the peer network to the source network. The gateway can then use this information to adapt communication in the source network to degradation in signal quality in the peer network and prevent communication problems in the peer network and/or the source network.

Typically, the peer quality of service indicator is transmitted in the return peer radio signal in a similar way to that by which the representation of the source quality of service indicator is sent in the peer radio signal. So, it is preferred that the transmitter transmits the peer quality of service indicator and the content together in a data packet; that the transmitter transmits the peer quality of service indicator in a header of the data packet; that the peer quality of service indicator is a single bit; and that the transmitter transmits the peer quality of service indicator in a field of the return peer radio signal commonly used for flow control in the peer communications network.

It can be appreciated that the invention can be implemented by computer software. According to a further aspect of the present invention, there is therefore provided computer software or computer program code adapted to carry out the method described above when processed by a computer processing means. The computer software or computer program code can be carried by computer readable media. The media may be a physical storage media such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a computer running the software or code, e.g. a computer configured to carry out the method described above.

Preferred embodiments of the invention will now be described, by way of example only, with reference to the accompanying drawings, in which:

FIG. 3 is a schematic illustration of a prior art header of a data packet sent in a Bluetooth® network; and FIG. 4 is a schematic illustration of a header of a data packet sent in the Bluetooth® network of the communication system of FIG. 1.

Figure 1:
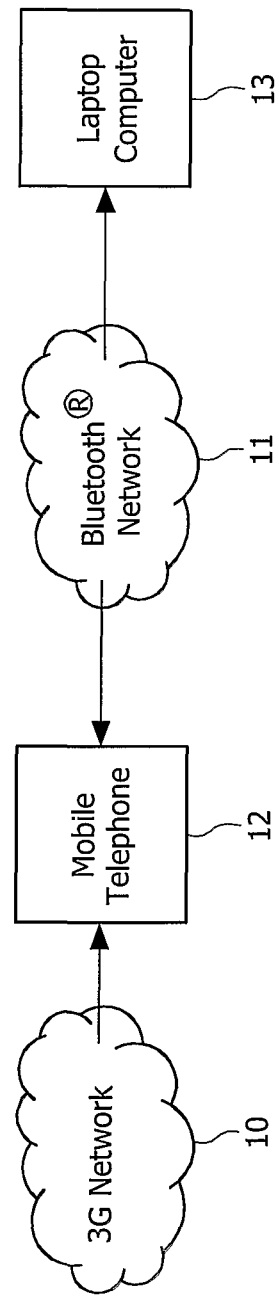
FIG. 1 is a schematic illustration of a communication system according to the invention.

Referring to FIG. 1, a communication system includes two radio communications networks, a Third Generation Wireless Format (3G) mobile telecommunications network 10 and a Bluetooth® network 11. The 3G network is described in detail in the various Third Generation Partnership Project (3GPP) specifications, such as those found at http://3gpp.org/specs/specs.htm. The Bluetooth® network is described in detail in Bluetooth® Core Specification v1.2, Bluetooth® SIG, 5 Nov. 2003.

A mobile telephone 12 acts as a radio communications gateway by communicating over both the 3G network 10 and the Bluetooth® network 11. More specifically, in this embodiment, the mobile telephone 12 communicates with another mobile telephone (not shown) over the 3G network 10 via network infrastructure, e.g. a base station, (not shown) and with a radio terminal implemented in a Bluetooth® enabled laptop PC (Personal Computer) 13 over the Bluetooth® network 11. The mobile telephone 12 is therefore able to relay content between the other mobile telephone and the laptop PC 13, as described in more detail below.

The mobile telephone 12 has a 3G RF unit (not shown) for transmitting and receiving signals over the 3G network 10 and a Bluetooth® RF unit (not shown) for transmitting and receiving signals over the Bluetooth® network 11. The RF units are able to perform all appropriate coding/decoding and modulation/demodulation to transmit and receive signals in the respective networks 10, 11 under the control of a digital signal processor (DSP) (not shown) of the mobile telephone 12. The DSP and RF units achieve this by operating software that is either embedded in their hardware or stored in associated memory. Operation of the mobile telephone 12 can therefore be considered with reference to a protocol stack 20 defining operation of this software.

The laptop PC 13 has a Bluetooth® RF unit (not shown) for transmitting and receiving signals over the Bluetooth® network 11. The RF unit might be implemented in a removable component of the laptop PC 13, e.g. a PC card, or integrated in the laptop PC 13, e.g. using an Intel Centrino® processor. The RF unit is able to perform all appropriate coding/decoding and modulation/demodulation to transmit and receive signals in the Bluetooth® network 11 under the control of a central processing unit (CPU) (not shown) of the laptop PC 13. The CPU and RF unit achieve this by operating software that is either embedded in their hardware or stored in associated memory. Operation of the laptop PC 13 can therefore be considered with reference to a protocol stack 24 defining operation of this software.

Figure 2:
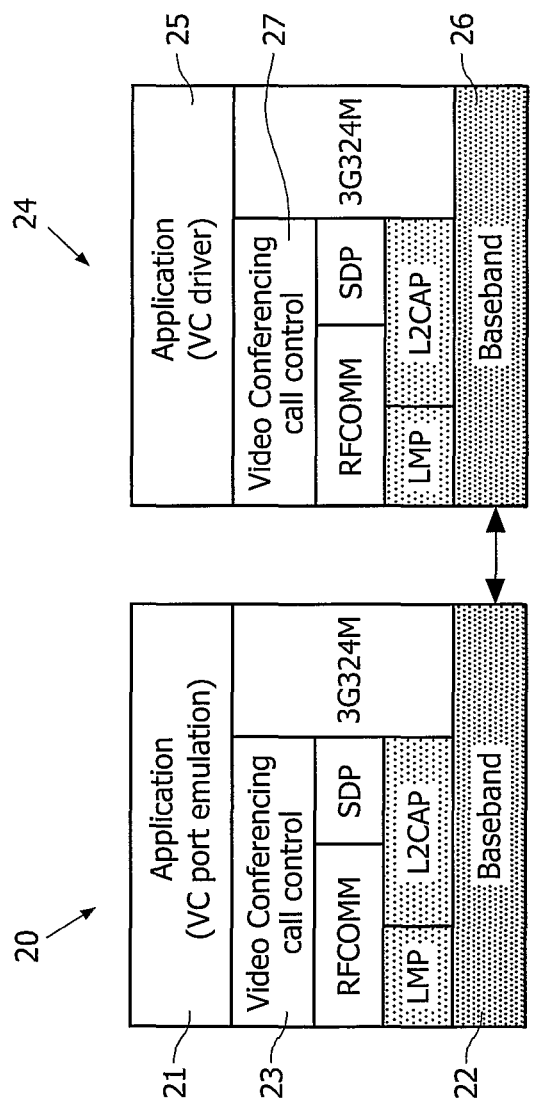
FIG. 2 is a schematic illustration of protocol stacks of a mobile telephone and a laptop computer of the communications system of FIG. 1.

Referring to FIG. 2, the protocol stack 20 of the mobile telephone 12 comprises an application layer 21 at the top of the stack 20 and a baseband layer 22 at the bottom of the stack 20. In this embodiment, a Video Conferencing (VC) port emulation application is run at the application layer 21. The protocol stack 20 therefore includes a video conferencing call control layer 23 next below the application layer 21. Other layers in the illustrated protocol stack 20 are called RFCOMM, SOP, LMP and L2CAP. These layers are specific to Bluetooth® and will not be described in detail in this document. Similarly, another layer, called a 3G324M layer, is provided in which to run software for allowing communication over the 3G network 10. This is specific to 3G and not described in detail in this document.

A protocol stack 24 of the laptop PC 13 is similar to that of the mobile telephone 12. In other words, the protocol stack has an application layer 25, a baseband layer 26 and a video conferencing call control layer 27. It also has the RFCOMM, SOP, LMP and L2CAP layers of Bluetooth® and the 3G324M layer of 3G. In this embodiment, a VC port driver is run at the application layer 25 of the protocol stack 24.

In use, a video conference call is set up in the conventional manner. This is described in more detail in Video Conferencing Profile v0.95c, Audio/Video Working Group, Bluetooth® SIG, 23 Sep. 2002; 3GPP TS 26.234 Technical Specification Group Services and System Aspects—"Transparent end-to-end Packet-switched Streaming Service (PSS); Protocols and codecs"; 3GPP TS 26.111 Technical Specification Group Services and System Aspects—"Codec for circuit switched multimedia telephony service; Modifications to H.324"; and ITU-T Recommendation H.324— "Terminal for low bit-rate multimedia communication". The call set up protocols of both Bluetooth® and 3G include signaling relating to signal quality. Consequently, the call set up creates a communication link in the 3G network 10 at a determined data rate and using error correction consistent with the signal quality over the communication link. Similarly, the call set up creates another communication link in the Bluetooth® network 11 at a determined data rate and using error correction consistent with the signal quality over the Bluetooth® communication link.

Referring to FIG. 3, in the prior art, baseband data packets are sent over the Bluetooth® network 11 with a packet header 30. The header 30 is 18 bits long and includes: a 3 bit LT_ADDR field for a logical transport address of the data packet; a 4 bit TYPE field for specifying which of sixteen different types the data packet is; a 1 bit FLOW field for flow control information; a 1 bit ARQN field for acknowledgement of successful receipt of data packets; a 1 bit SEQN field for sequential numbering of data packets; and an 8 bit HEC field that carries packet header error check information that can be used to verify the header.

The video conference call is transmitted over the Bluetooth® network using Synchronous Connection Oriented (SCO) and extended SCO (eSCO) baseband data packets. Unlike Asynchronous Connection-Less (ACL) baseband data packets in Bluetooth®, the SCO and eSCO baseband data packets do not use the FLOW field of the packet header 30. Indeed, the protocol stacks 20, 24 are conventionally configured to ignore the FLOW field of the packet header 30 of SCO and eSCO baseband data packets. However, according to this embodiment of the invention, the FLOW field is replaced with a 1 bit Pseudo Channel Quality Indicator (P-CQI) field, as shown in FIG. 4, which is used to carry quality of service information.

Data packets in signals received by the mobile telephone 12 over the 3G network 10 include a Channel Quality Indicator (CQI) specifying signal quality in the 3G network. The mobile telephone 12 extracts the CQI from the data packets and converts it into the P-CQI for transmission to the laptop PC 13 over the Bluetooth® network. The CQI is 5 bits long and the P-CQI is 1 bit long. So, in one embodiment, when the value of the CQI is over a threshold the mobile telephone 12 sets the P-CQI value as 1 and when it is under the threshold the mobile telephone 12 sets the P-CQI value as 0. In another embodiment, the value of the CQI is spread over several, e.g. 5, P-CQIs using a shift register and generator polynomial system (not shown).

The laptop PC 13 extracts the P-CQI from the packet header 40 of the data packets it receives from the mobile telephone 12 over the Bluetooth® network 11. The extracted P-CQIs are passed to the application layer 25 of the protocol stack 24 of the laptop PC 13. In this embodiment, the VC driver application then decides whether or not to alter the VC call properties based on the P-CQI value. For example, if the P-CQI value is indicative of poor channel quality in the 3G network, the rate at which the application produces data for transmission may be slowed.

At the same time, the laptop PC 13 monitors signal quality in the Bluetooth® network 11. In this embodiment, data packets received by the laptop PC 13 over the Bluetooth® network are error checked. If a packet fails the error check, then a request for it to be re-sent it transmitted to the mobile telephone 12. In addition, the laptop PC 13 monitors the rate at which data packets fail the error check. An indication of this rate is transmitted to the mobile terminal 12 as the P-CQI. For example, if the rate is over a threshold level, the P-CQI is set to 1 and if the rate is below a threshold level, the P-CQI is set to 0. The mobile telephone 12 then uses the P-CQI it receives from the laptop PC 13 to alter signal transmission settings in the 3G network 10. In another embodiment, the P-CQI can be sent over the 3G network 10 to the other mobile telephone with which the mobile telephone 12 is communicating via the network infrastructure.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. A radio communications gateway between networks, the radio communications gateway comprising:
   a source receiver configured to receive a source radio signal over a source communications network using a first communications protocol;
   a peer transmitter configured to transmit a peer radio signal over a peer communications network using a second communications protocol different than the first communications protocol;
   and an interface configured to forward content represented by the source radio signal from the source receiver to the peer transmitter for representation in the peer radio signal,
   wherein the source radio signal includes a multi-bit source quality of service indicator specifying a signal quality of the source communications network in accordance with the first communications protocol,
   wherein the interface is configured to convert the multi-bit source quality of service indicator into a single bit representation of the multi-bit source quality of service indicator in accordance with the second communications protocol and the peer transmitter is configured to transmit the single bit representation of the source quality of service indicator with the content in the peer radio signal in an unused field of a data packet based on the content carried by the peer radio signal, and wherein a terminal that receives the peer radio signal adapts communications in the peer communications network based on the representation of the source quality of service indicator.

2. The radio communications gateway of claim 1, wherein the peer transmitter is configured to transmit the representation of the source quality of service indicator and the content together in a data packet.

3. The radio communications gateway of claim 2, wherein the peer transmitter is configured to transmit the representation of the source quality of service indicator in a header of the data packet.

4. The radio communications gateway of claim 1, wherein the peer transmitter is configured to transmit the representation of the source quality of service indicator in a field of the peer radio signal used for flow control in the peer communications network.

5. The radio communications gateway of claim 1, wherein the peer communications network is a wireless local area network.

6. The radio communications gateway of claim 1, wherein the peer communications network is a Bluetooth® network.

7. The radio communications gateway of claim 1, wherein the source communications network is a mobile telecommunications network.

8. The radio communications gateway of claim 1, wherein the source communications network is a 3G network.

9. The radio communications gateway of claim 1, wherein the content is audiovisual data.

10. The radio communications gateway of claim 1, comprising:
a peer receiver configured to receive a return peer radio signal over the peer communications network;
and a source transmitter configured to transmit a return source radio signal over the source communications network,
wherein the interface is configured to forward content represented by the return peer radio signal from the peer receiver to the source transmitter for representation in the return source radio signal and the peer radio signal includes a peer quality of service indicator specifying a quality of service in the peer communications network.

11. The radio communications gateway of claim 10, wherein the source transmitter is configured to transmit a representation of the peer quality of service indicator in the source radio signal.

12. The radio communications gateway of claim 1 wherein the unused field is a flow bit.

13. A radio communications terminal, comprising:
a receiver configured to receive from a radio communications gateway a peer radio signal over a peer communications network using a second communications protocol, the peer radio signal representing content from a source radio signal sent over a source communications network using a first communications protocol different than the second communications protocol, to the radio communications gateway, the peer radio signal including a single bit representation of a source quality of service indicator, which indicates a signal quality of the source communications network in accordance with the first communications protocol and transmitted in an unused field of a data packet based on content carried by the peer radio signal; and
a controller configured to adapt communications in the peer communications network based on the received single bit representation of the source quality of service indicator,
wherein the source radio signal includes a multi-bit source quality of service indicator specifying the signal quality of the source communications network, and
wherein the gateway is configured to convert the multi-bit source quality of service indicator into the single bit representation of the source quality of service indicator in accordance with the second communications protocol and the receiver is configured to receive the single bit representation of the source quality of service indicator from the radio communications gateway in the peer radio signal.

14. The radio communications terminal of claim 13, having a protocol stack and wherein the receiver is configured to receive the representation of the source quality of service indicator at a first layer in the protocol stack and configured to interpret the representation of the source quality of service indicator at a second layer in the protocol stack, the second layer being higher than the first layer.

15. The radio communications terminal of claim 14, wherein the second layer is an application layer.

16. The radio communications terminal of claim 13, comprising a transmitter configured to transmit a return peer radio signal to the radio communications gateway over the peer communications network, the return peer radio signal representing content to be sent over the source communications network by the radio communications gateway,
wherein the return peer radio signal includes a peer quality of service indicator specifying a quality of service in the peer communications network.

17. The radio communications terminal of claim 16, wherein the transmitter is configured to transmit the peer quality of service indicator and the content together in a data packet.

18. The radio communications terminal of claim 17, wherein the transmitter is configured to transmit the peer quality of service indicator in a header of the data packet.

19. The radio communications terminal of claim 16, wherein the transmitter is configured to transmit the peer quality of service indicator in a field of the return peer radio signal used for flow control in the peer communications network.

20. A radio communications system, comprising:
a radio communications gateway comprising a source receiver configured to receive a source radio signal over a source communications network using a first communications protocol, a peer transmitter configured to transmit a peer radio signal over a peer communications network using a second communications protocol different than the first communications protocol, and an interface configured to forward content represented by the source radio signal from the source receiver to the peer transmitter for representation in the peer radio signal, wherein the source radio signal includes a multi-bit source quality of service indicator specifying a signal quality of the source communications network in accordance with the first communications protocol, wherein the interface is configured to convert the multi-bit source quality of service indicator into a single bit representation of the multi-bit source quality of service indicator in accordance with the second communications protocol, and the peer transmitter is configured to transmit the single bit representation of the source quality of service indicator with the content in the peer radio signal in an unused field of a data packet based on the content carried by the peer radio signal, and wherein a terminal that receives the peer radio signal adapts communications in the peer communications network based on the representation of the source quality of service indicator; and a terminal comprising a receiver configured to receive from the radio communications gateway the peer radio signal over the peer communications network, the peer radio signal representing content from the source radio signal sent over the source communications network to the radio communications gateway, wherein the receiver of the terminal is configured to receive the single bit representation of the source quality of service indicator from the radio communications gateway in the peer radio signal.

21. A method of operating a radio communications gateway, the gateway having a source receiver for receiving a source radio signal over a source communications network using a first communications protocol and a peer transmitter for transmitting a peer radio signal over a peer communications network using a second communications protocol different than the first protocol, the method comprising:

forwarding content represented by the source radio signal from the source receiver to the peer transmitter for representation in the peer radio signal, wherein the source radio signal includes a multi-bit source quality of service indicator specifying a signal quality of the source communications network in accordance with the first communications protocol;

converting the multi-bit source quality of service indicator into a single bit representation of the source quality of service indicator in accordance with the second communications protocol; and transmitting, by the peer transmitter, the single bit representation of the source quality of service indicator in the peer radio signal in an unused field of a data packet based on content carried by the peer radio signal, wherein a terminal that receives the peer radio signal adapts communications in the peer communications network based on the representation of the source quality of service indicator.

22. The method of claim 21, further comprising the peer transmitter transmitting the representation of the source quality of service indicator and the content together in a data packet.

23. The method of claim 22, further comprising the peer transmitter transmitting the representation of the source quality of service indicator in a header of the data packet.

24. The method of claim 21, further comprising the transmitter transmitting the representation of the source quality of service indicator in a field of the peer radio signal used for flow control in the peer communications network.

25. The method of claim 21, wherein the gateway has a peer receiver for receiving a return peer radio signal over the peer communications network and a source transmitter for transmitting a return source radio signal over the source communications network, the method comprising passing content represented by the return peer radio signal from the peer receiver to the source transmitter for representation in the return source radio signal, wherein the peer radio signal includes a peer quality of service indicator specifying quality of service in the peer communications network.

26. The method of claim 25, comprising the source transmitter transmitting a representation of the peer quality of service indicator in the source radio signal.

27. The method of claim 21, further comprising:

receiving from the radio communications gateway the peer radio signal over the peer communications network, the peer radio signal representing content from the source radio signal sent over the source communications network to the radio communications gateway, and receiving the single bit representation of the source quality of service indicator from the radio communications gateway in the peer radio signal.

28. A method of operating a radio communications terminal, the method comprising:

receiving from a radio communications gateway a peer radio signal over a peer communications network using a second communications protocol, the peer radio signal representing content from a source radio signal sent over a source communications network using a first communication protocol different than the second communications protocol, to the radio communications gateway, wherein the source radio signal includes a multi-bit source quality of service indicator specifying a signal quality of the source communications network in accordance with the first communications protocol and the method includes converting the multi-bit source quality of service indicator into a single bit representation of the source quality of service indicator in accordance with the second communications protocol, receiving the single bit representation of the source quality of service indicator from the radio communications gateway in the peer radio signal transmitted in an unused field of a data packet based on content carried by the peer radio signal, and adapting communications in the peer communications network based on the received representation of the source quality of service indicator.

29. The method of claim 28, wherein the terminal has a protocol stack and the method comprises receiving the representation of the source quality of service indicator at a first layer in the protocol stack and interpreting the representation of the source quality of service indicator at a second layer in the protocol stack, the second layer being higher than the first layer.

30. The method of claim 29, wherein the second layer is an application layer.

31. The method of claim 28, further comprising transmitting a return peer radio signal to the radio communications gateway over the peer communications network, the return peer radio signal representing content to be sent over the source communications network by the radio communications gateway, wherein the return peer radio signal includes a peer quality of service indicator specifying quality of service in the peer communications network.

32. The method of claim 31, further comprising transmitting the peer quality of service indicator and the content together in a data packet.

33. The method of claim 30, further comprising transmitting the peer quality of service indicator in a header of a data packet.

34. The method of claim 31, further comprising transmitting the peer quality of service indicator in a field of the return peer radio signal used for flow control in the peer communications network.

35. A non-transitory computer readable medium comprising instructions stored therein which upon execution instruct a processor of a gateway to:

receive, using a source receiver of the gateway, a source radio signal over a source communications network using a first communications protocol, the gateway further comprising a peer transmitter to transmit a peer radio signal over a peer communications network using a second communications protocol different than the first communications protocol;

forward content represented by the source radio signal from the source receiver to the peer transmitter for representation in the peer radio signal, wherein the source radio signal includes a multi-bit source quality of service indicator specifying a signal quality of the source communications network in accordance with the first communications protocol;

convert the multi-bit source quality of service indicator into a single bit representation of the source quality of service indicator in accordance with the second communications protocol; and transmit the single bit representation of the source quality of service indicator in the peer radio signal using the peer transmitter in an unused field of a data packet based on content carried by the peer radio signal, wherein a terminal that receives the peer radio signal adapts communications in the peer communications network based on the representation of the source quality of service indicator.

* * * * *